June 18, 1957  R. C. SNYDER  2,795,896
ANIMATED CARICATURE
Filed Sept. 21, 1954
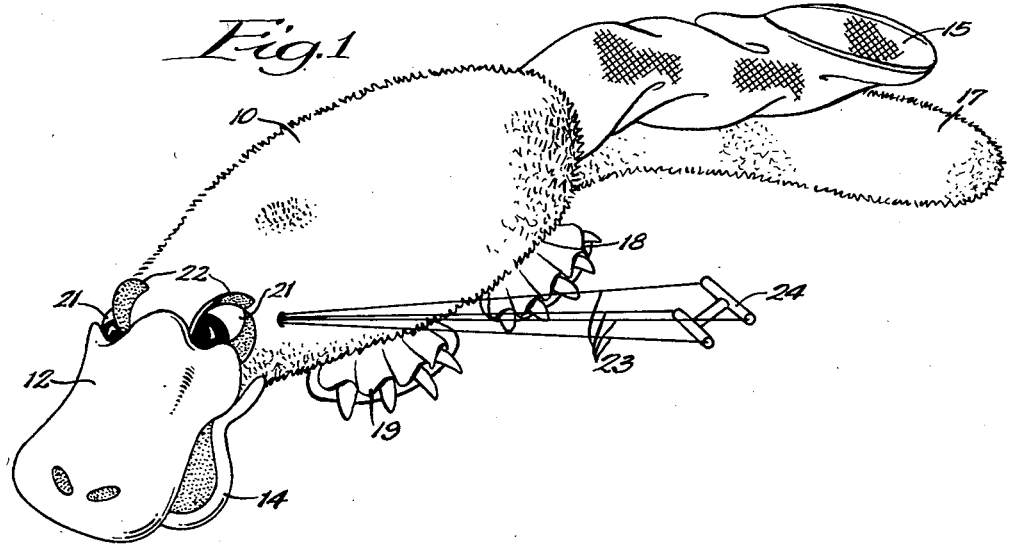
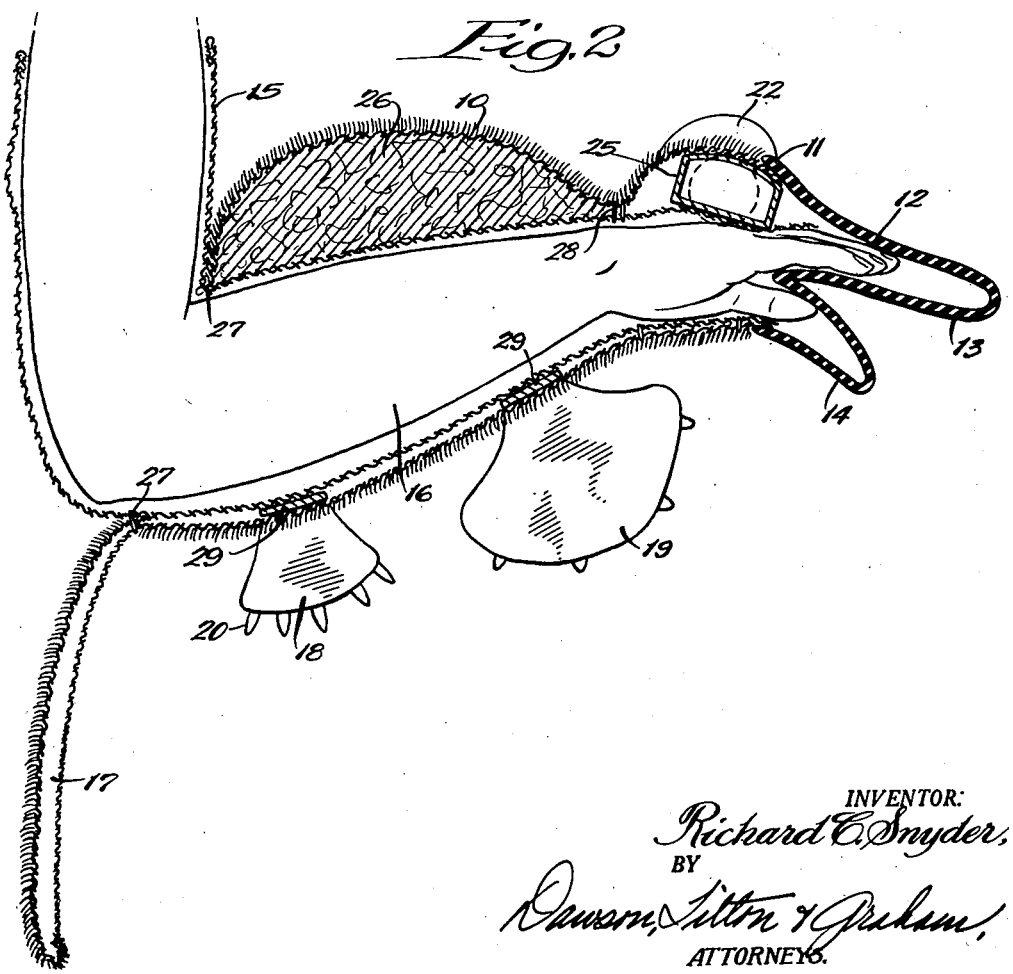
INVENTOR:
Richard C. Snyder,
BY
Dawson, Tilton & Graham
ATTORNEYS.

United States Patent Office 2,795,896
Patented June 18, 1957

2,795,896

ANIMATED CARICATURE

Richard C. Snyder, Chicago, Ill.

Application September 21, 1954, Serial No. 457,421

2 Claims. (Cl. 46—154)

This invention relates to an animated caricature, and more particularly to a caricature of an animal or other creature adapted to be positioned upon the arm of a person and to be manipulated or animated by the arm, hand and/or finger movements thereof. Generally, the caricature is similar to a ventriloquist's dummy and may be referred to as a ventrilette.

An object of this invention is to provide a caricature of an animal or other creature that is educationally and scientifically accurate in all details of basic construction. Another object is to provide a caricature as described which is adapted to be manipulated by movements of the arm, hand and/or fingers of an animator, the caricature being so constructed and arranged that a lifelike representation of the creature is achieved by such movement. Still another object is in the provision of a ventrilette arranged to receive the arm and hand of an animator in the hollow body thereof, the ventrilette being responsive to the hand, finger and arm movements of the animator and being so arranged that a lifelike characterization of a selected creature is present by the response thereof to such movements.

A further object of the invention is in providing a structure as described in which the characterization is built upon an elongated tubular sleeve adapted to receive the arm and hand of an animator therein, the body, head and face portions of the animal being movable individually or responding respectively to movements of the arm, hand and fingers. A further object of the invention is to provide a structure of the character heretofore described in which a characterization of an animal or other creature is mounted upon a tubular sleeve and is secured thereto at preselected points whereby the animal may be positioned upon the arm of an animator and withdrawn therefrom by pulling respectively the sleeve and face portion of the animal, whereby the body and head are not distorted or damaged etc. during such operations. Yet a further object is to provide in that structure an elongated sleeve that extends beyond the elbow of the animator whereby the natural bend of the elbow in cooperation with the sleeve is effective to anchor the animal upon the arm and prevent unwanted creepage, slippage and other movement of the animal relative to the arm of the animator. Yet a further object is in providing an animal characterization as described which has a fully formed body and an elongated sleeve portion extending therethrough and outwardly therefrom; the outwardly extending sleeve portion being adapted to be stuffed into the interior of the body in substitution for an animator's arm to maintain the natural shape and form of the animal. Additional objects and advantages will appear as the specification proceeds.

An embodiment of the invention is illustrated in the accompanying drawing, and while the caricature of an animal is there depicted, specifically an Australian duckbill or platypus, it should be appreciated that the caricature need not be that of an animal but may be any other creature, and the representation need not be a caricature but may be symbolic in other forms or may be an accurate reproduction of the creature. In the drawing—

Figure 1 is a perspective view of a structure embodying the invention; and Figure 2 is a longitudinal sectional view showing the creature in position upon the arm of an animator.

The caricature comprises a body 10 equipped with a head 11 having a bill 12 comprising an upper bill portion 13 and a lower bill portion 14. The caricature is mounted upon an elongated sleeve 15 adapted to receive the arm 16 of an animator therein. The animal illustrated has a tail 17 and has also rear feet 18 and front feet 19, each having toes 20.

As is shown best in Figure 1, the animal has eyes 21 and lids 22 extending upwardly therefrom. Preferably, the eyes 21 and the lids 22 are movable and may be controlled for separate movement by the draw cords 23 which are secured to the handle member 24. The cords at their inner ends are connected to appropriate mechanism within a box or container 25 which is concealed within the head 11 of the animal. It will be appreciated that suitable springs and gears etc. are positioned within the container 25 and are operatively arranged with the eyes and lids so that movement thereof is provided when the draw strings 23 are moved.

The sleeve 15 is elongated and is intended to extend beyond the elbow of the animator, as is indicated in Figure 2. The sleeve may be made from suitable material, and preferably is cloth that may be black in color. However, other materials may be employed, and it may at times be desirable to provide a sleeve that is transversely or circumferentially elasticized, while axially the sleeve should be substantially non-stretchable or inelastic.

The body portion 10 of the caricature may be formed of cloth or other material, and desirably is suitably padded at 26 so that the physical appearance of the body is representative of the animal or creature being characterized. The bill 12 may be rigid or it may be formed of flexible material that can be manipulated and distorted by appropriate movement of the fingers of the animator's hand. I have found that rubber which has sufficient stiffness to maintain the general desired outline but yet is relatively flexible is a suitable material for forming the bill. In the illustration given, the bill 12 is formed by coating with liquid rubber a clay mold that provides the desired physical characteristics to be reproduced in the bill. The bill may be adhesively secured to the fabric covering the body and head, or it may be sewed or otherwise securely fastened thereto.

The sleeve 15 extends forwardly, and at its forward end is connected to the bill portion 14 and to the bill portion 13. Adjacent the rear end of the body, the sleeve may be stitched as at 27 to the body. If thought desirable, intermediate stitching 28 may be employed and, as shown in Figure 2, this stitching also serves to partially define the outward appearance of the caricature. The feet 18 and 19 may also be stitched or otherwise secured to the fabric covering of the body, and bands 29 secured to the feet may extend beyond the body covering and the sleeve 15 to provide the means for mounting the feet.

It will be noted that the opening into the body 10 of the animal is above the tail 17, and when the animal is placed upon a support surface a planar relationship is established between the tail, the under-surface of the body and the feet 18 and 19. This relationship contributes to the realistic appearance of the animal when it is off of the animator's arm. To provide further body for the caricature, the end portion of the sleeve 15 which extends beyond the tail 17 may be stuffed inwardly and into the body 10.

In use of the caricature, it is positioned upon the arm 16 of the animator by grasping the rear or extended end portion of the sleeve 15 and by pulling the sleeve upwardly and onto the arm. The sleeve extends completely through the body of the animal and is attached to the face or bill portion thereof. Thus, in the positioning operation the pulling force is applied to the sleeve and not directly to the animal, and damage to the animal which might follow from pulling forces exerted thereon is completely obviated. In removing the animal from the animator's arm, the face or bill 12 is grasped and the animal is then pulled off of the arm. This pulling force is applied directly to the sleeve and, again, damage etc. to the animal body is avoided since no pulling forces are exerted thereon.

In mounted position upon the animator's arm the bill, head and body of the caricature may be individually manipulated, and it will be appreciated that movement of the arm to manipulate the caricature will have the effect of causing the caricature, and particularly the body portions thereof, to move relative to the arm. Specifically, there is a tendency for the body to creep forwardly on the arm and to rotate relative thereto. This tendency, however, is avoided in this structure for the sleeve 15 provides an extended portion that goes beyond the elbow and covers the upper arm of the animator. Since in use the elbow is normally bent, as is shown in Figure 2, the sleeve 15 is rigidly anchored in position upon the arm by the crook of the elbow; the caricature being itself securely fastened to the sleeve, it cannot creep or rotate upon the arm 16.

The caricature is realistic both in use and when not in use for the natural contours of the body are respected; and when the extended end portion of the sleeve is stuffed within the body, the pad curves naturally downwardly and the tail forms a smooth continuation thereof. In use, the caricature may be maintained with facility in either a horizontal or vertical position, and the individual movements provided for the bill, head and body permit animation which is exceptionally realistic. For example, the nose or bill portion 13 may be manipulated and contorted by the fingers of the animator to provide numerous facial expressions and movements that may be indicative of various moods and antics of the animal.

It will not be apparent that the caricature can serve a dual function, namely that of a ventrilette wherein it is positioned upon an arm, as indicated in Figure 2, and animated or brought to life by the muscular movements of the arm, hand and fingers. It may also be used as a toy, and in such case the elongated end portion of the sleeve 15 will be stuffed into the interior of the body 10 and replace the animator's arm. It is clear from Figure 2 that the opening in the posterior end of the body, into which the elongated sleeve is stuffed, is located immediately above the tail appendage 17 of the animal or other creature caricature. All of the natural appendages, such as feet, ears, whiskers, antenna, tongue, etc., that the creature may have will be attached at selected points to the body, head and bill of the creature.

While in the foregoing specification an embodiment of the invention has been set out in considerable detail for purposes of illustration, it will be readily apparent to those skilled in the art that numerous changes in those details may be made without departing from the spirit and principles of the invention.

I claim:

1. In an animated toy structure, a body equipped with a head at one end thereof and with a tail appendage at the other end thereof, said body, head and tail having generally the physical characteristics of a selected creature, said head being adapted to be animated by the arm, hands and fingers of an animator, said body having an elongated opening extending longitudinally therethrough and communicating with the interior of said head, a sleeve extending through said opening and secured at its forward portion to said head portion, said sleeve being elongated and extending beyond said body and to a length receiving the elbow of the person whose arm is inserted therein for the operation of said head, said body being flexible and assuming the natural position of the animal when said sleeve is withdrawn from the arm of the wearer and inserted within said toy.

2. The structure of claim 1, in which the sleeve, when stuffed into the opening of the body, substantially supports the flexible body to give a realistic appearance of the animal, the sleeve substantially providing the volume formerly supplied by the arm of the animator.

References Cited in the file of this patent

UNITED STATES PATENTS

| 961,812 | Siegel | June 21, 1910 |
| 2,655,762 | Burke | Oct. 20, 1953 |

FOREIGN PATENTS

| 922,397 | France | June 6, 1947 |